United States Patent
Akiyama

(10) Patent No.: US 7,213,927 B2
(45) Date of Patent: May 8, 2007

(54) PROJECTOR WITH ELECTROOPTICAL MODULATOR

(75) Inventor: Koichi Akiyama, Matsumoto (JP)

(73) Assignee: Seiko Epson Corporation, Tokyo (JP)

( * ) Notice: Subject to any disclaimer, the term of this patent is extended or adjusted under 35 U.S.C. 154(b) by 165 days.

(21) Appl. No.: 11/072,949

(22) Filed: Mar. 7, 2005

(65) Prior Publication Data

US 2005/0195374 A1 Sep. 8, 2005

(30) Foreign Application Priority Data

Mar. 8, 2004 (JP) ............... 2004-064439

(51) Int. Cl.
*G03B 21/14* (2006.01)
*G03B 21/20* (2006.01)
*G02B 9/00* (2006.01)

(52) U.S. Cl. ............... 353/97; 353/102; 359/740

(58) Field of Classification Search ............... 353/30, 353/31, 33, 97, 102, 122; 348/742, 743, 348/744; 359/740
See application file for complete search history.

(56) References Cited

U.S. PATENT DOCUMENTS

| 5,428,467 A | 6/1995 | Schmidt |
| 6,540,361 B1 | 4/2003 | Hayashi |
| 2005/0179872 A1* | 8/2005 | Akiyama ............... 353/31 |
| 2006/0092390 A1* | 5/2006 | Akiyama ............... 353/102 |
| 2006/0164601 A1* | 7/2006 | Akiyama ............... 353/33 |

FOREIGN PATENT DOCUMENTS

| EP | 1 489 457 A1 | 12/2004 |
| JP | 11-352444 | 12/1999 |
| JP | A-2001-296841 | 10/2001 |
| JP | A-2002-148712 | 5/2002 |
| JP | 2004-045872 | 2/2004 |
| WO | WO 03/083573 A1 | 10/2003 |

OTHER PUBLICATIONS

Taiichiro Kurita, "Picture Quality of Hold Type Display-for Moving Images", *Technical Report of IEICE*, EID99-10 (Jun. 1999), pp. 55-60 (w/English translation).

* cited by examiner

*Primary Examiner*—Melissa Jan Koval
(74) *Attorney, Agent, or Firm*—Oliff & Berridge, PLC

(57) ABSTRACT

Exemplary embodiments provide a projector having a structure capable of easy miniaturization and capable of achieving a smooth moving picture display of good quality. A projector including: an illuminating apparatus; a color separating optical system; liquid crystal display devices; and a projecting optical system, the projector further including: a shielding member provided in the vicinity of a light emitting surface of a first lens array and in which a light transmitting area and a light non-transmitting area are alternately arranged in an optical path in a first direction vertical to an optical axis of illumination; and a rotating prism, which is provided between a superimposing lens and the color separating optical system, for scanning an illuminating light bundle in image forming areas of the liquid crystal display devices synchronously with screen writing frequencies of the liquid crystal display devices.

13 Claims, 12 Drawing Sheets

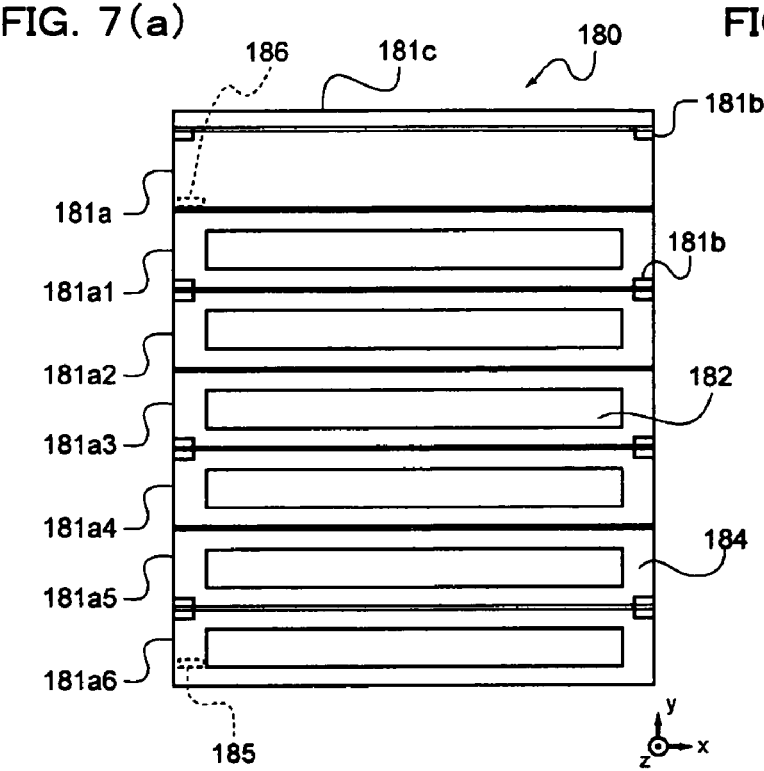
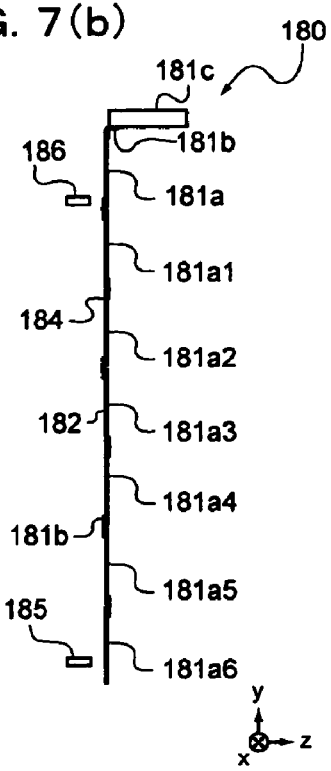
FIG. 7(a)
FIG. 7(b)

— EXAMPLE OF IDEAL DISPLAY LIGHT
--- EXAMPLE OF ACTUAL DISPLAY LIGHT

PROJECTOR WITH ELECTROOPTICAL MODULATOR

BACKGROUND

Exemplary embodiments relate to a projector.

FIG. 11(a) illustrates an optical system of a related art projector. FIGS. 11(b) and 11(c) illustrate a problem of the related art projector.

In a related art projector 900A, liquid crystal display devices 400R, 400G and 400B, used as an electrooptic modulating apparatus, are a holding type of display devices having a brightness characteristic illustrated in FIG. 11(b). Accordingly, there is a problem that a so-called persistence prevents a smooth moving picture display from being obtained, differently from a case of using a CRT, which is an impulse type of display device having a brightness characteristic illustrated in FIG. 11(c). As for the persistence, see, e.g., "Picture Quality of Hold Type Display for Moving Images" (Pages 55 to 60 in EID99-10, Taiichiro Kurita, NHK Science and Technical Research Laboratories, (1999–06)).

FIG. 12(a) illustrates an optical system of another related art projector. FIGS. 12(b) and 12(c) illustrate an optical shutter used for such another related art projector.

In a related art projector 900B, as shown in FIG. 12(a), optical shutters 420R, 420G and 420B are provided on a light incident side of the liquid crystal devices 400R, 400G and 400B to intermittently obstruct the light using the optical shutters so that the above-mentioned problem would be solved. That is to say, moderating the so-called persistence enables a smooth moving picture display of good quality to be obtained. See, JP-A-2002-148712, for example.

SUMMARY

There is, however, a problem in the related art projector such that miniaturization of a projector is not easy due to the optical shutters provided respectively just before the three liquid crystal display devices. Further, the optical shutter is used to intermittently obstruct light in such a projector. This causes a problem that efficiency in using light is generally always lowered largely not only in the case of arranging a smooth moving picture display of good quality to be obtained but also in the case of displaying a stationary picture or the case that the brightness of a screen has priority over the smoothness in displaying a moving picture.

Exemplary embodiments of the invention address the above problems. The first object of exemplary embodiments of the invention is to provide a projector having a structure in which miniaturization is easy even in the case that a smooth moving picture display of good quality is arranged to be provided. The second object of exemplary embodiments of the invention is to provide a projector in which efficiency in using light is not extremely deteriorated even in the case of displaying a stationary picture or the case that the brightness of a screen has priority over the smoothness in displaying a moving picture.

(1) A projector in accordance with exemplary embodiments of the invention is a projector including: a light source apparatus to emit a substantially parallel illuminating light bundle to an illuminated area side; a first lens array having a plurality of lenses to divide the illuminating light bundle emitted from the light source apparatus into a plurality of partial light bundles; a second lens array having a plurality of lenses corresponding to the plurality of lenses of the first lens array; a superimposing lens to superimpose the respective partial light bundles from the second lens array in the illuminated area; a color separating optical system to separate the light bundle from the superimposing lens into light bundles corresponding to a plurality of colored light; a plurality of electrooptic modulating apparatuses to modulate the light bundles separated by the color separating optical system in accordance with the respective image information; a projecting optical system to project a light bundle modulated by the plurality of electrooptic modulating apparatuses; a shielding member in the vicinity of a light emitting surface or a light incident surface of the first lens array, in which a light transmitting area and a light non-transmitting area are alternately arranged in an optical path in a first direction vertical to an optical axis of illumination; and a scanning device provided between the superimposing lens and the color separating optical system to scan an illuminating light bundle in an image forming area of the electrooptic modulating apparatus along the first direction synchronously with a screen writing frequency of the electrooptic modulating apparatus.

Therefore, since the projector in accordance with exemplary embodiments of the invention includes the shielding member and the scanning device, which are arranged as described above, the light radiated area and a light unradiated area in the image forming area of the electrooptic modulating apparatus are moved alternately. This results in moderation of the persistence, so that a projector capable of achieving a smooth moving picture display of good quality can be obtained.

Further, in the projector in accordance with exemplary embodiments of the invention, providing the shielding member having such an effect before color separation of an illuminating light bundle allows only one shielding member (and one unit of the scanning device) to be required although there are plural electrooptic modulating apparatuses, so that the projector can be prevented as much as possible from being manufactured large.

The projector in accordance with exemplary embodiments of the invention is thus a projector having a structure in which miniaturization is easy even in the case that a smooth moving picture display of good quality is arranged to be provided.

(2) In the projector according to (1) mentioned above, the shielding member being extendable and retractable between an extended position in the optical path and a setback position out of the optical path. In the above context, "an extended position in the optical path" means a position where the shielding member is provided in the optical path for the purpose of achieving a smooth moving picture display of good quality. On the other hand, "a setback position out of the optical path" means a position where the shielding member is provided out of the optical path so as not to shield the illuminating light bundle.

Such a structure enables the shielding member to be moved to the extended position in the optical path when a smooth moving picture display of good quality is required, so that the smooth moving picture display of good quality can be achieved. When a stationary picture is displayed or the brightness of a screen has priority over the smoothness in displaying a moving picture, moving the shielding member to the setback position out of the optical path allows a bright display screen to be obtained without largely lowering the efficiency in using light, and thereby, provides the second object of exemplary embodiments of the invention.

(3) In the projector according to (2) mentioned above, the shielding member being arranged to move in whole to at least one of extend and retract between the extended position and the setback position.

Such a structure enables the whole shielding member to be moved to the extended position in the optical path when a smooth moving picture of good quality is required, so that the smooth moving picture display of good quality can be provided. When a stationary picture is displayed or the brightness of a screen has priority over the smoothness in displaying a moving picture, moving the whole shielding member to the setback position out of the optical path allows a bright display screen to be provided.

(4) In the projector according to (2) mentioned above, the shielding member preferably includes a plurality of elements in which the light transmitting area and the light non-transmitting area are formed, and being arranged to extend and retract in whole so as to at least one of extend and retract between the extended position and the setback position.

Such a structure enables the whole shielding member to be extended to be located at the extended position in the optical path when a smooth moving picture of good quality is required, so that the smooth moving picture display of good quality can be achieved. When a stationary picture is displayed or the brightness of a screen has priority over the smoothness in displaying a moving picture, retracting the whole shielding member to be located at the setback position out of the optical path allows a bright display screen to be provided.

(5) In the projector according to any one of (2) to (4) mentioned above, the projector preferably further includes an alarm apparatus to provide an alarm when the shielding member is not located at least one of the extended position and the setback position.

Radiation of light from the light source apparatus with the shielding member being located at the extended or setback position causes undesirable scattering, which is likely to have a bad influence on other optical components. The above-mentioned structure, however, enables the alarm to allow the light from the light source apparatus not to be radiated in the case that the shielding member is not located at the extended or setback position. Thus, it is possible to reduce a bad influence on other optical components due to an undesirable scattering.

(6) In the projector according to any one of (1) to (5) mentioned above, T denotes a space between the shielding member and the first lens array, and satisfies a relation of 0.1 mm<T<2 mm.

In a lens integrator optical system for converting an illuminating light bundle from the light source apparatus into an evener light bundle, the respective lenses of the first lens array are provided conjugately with the electrooptic modulating apparatus. Accordingly, the shielding member is preferably provided in the vicinity of the first lens array in order to alternately move the light radiated area and a light unradiated area in the image forming area of the electrooptic modulating apparatus. From this point of view, it is preferable to satisfy a relation of T<2 mm, and more preferably, to satisfy a relation of T<1 mm.

On the other hand, when the space is too narrow, it is difficult to provide the shielding member with a predetermined space between the shielding member and a light-emitting surface or a light incident surface of the first lens array. Moreover, smooth movement of the shielding member is difficult between the extended position and the setback position. From this point of view, it is preferable to satisfy a relation of T>0.1 mm, and more preferably, to satisfy a relation of T>0.2 mm.

(7) In the projector according to any one of (1) to (6) mentioned above, L denotes a pitch to arrange the light transmitting area and the light non-transmitting area in the shielding member while D denotes a pitch to arrange the a lens array portion of the first lens array in the first direction, and satisfies a relation of L=D.

Such a structure enables the light transmitting area and the light non-transmitting area of the shielding member to be moved in a same phase in any line or row of lenses of the first lens array. This allows the light radiated area and the light unradiated area to be clearly separated in the image forming area of the electrooptic modulating apparatus to be smoothly moved.

(8) In the projector according to (7) mentioned above, $L_1$ denotes a length of the light transmitting area in the first direction while $L_2$ denotes a length of the light non-transmitting area in the first direction, and satisfies a relation of $L_1=L_2=L/2$.

Such a structure enables the light radiated area and the light unradiated area to be alternately moved at a time density of 50% in the image forming area of the electrooptic modulating apparatus. Accordingly, the projector can provide a moving picture display of good quality without largely lowering the efficiency in using light.

(9) In the projector according to any of (1) to (8) mentioned above, $W_1$ denotes a length of the light transmitting area in a second direction vertical to the first direction, $W_2$ denotes a length of the light non-transmitting area in the second direction and E denotes a length of the lens array portion of the first lens array in the second direction, and satisfies a relation of $W_1 \geq E$ and $W_2 > E$.

Such a structure allows the light radiated area and the light unradiated area to be formed for the whole width of the image forming area of the electrooptic modulating apparatus.

(10) In the projector according to any of (1) to (9) mentioned above, the scanning device includes a rotating prism having a rotating axis vertical to the optical axis of illumination.

Such a structure enables a smooth scrolling operation between the light radiated area and the light unradiated area to be provided in the image forming areas of the respective electrooptic modulating apparatuses in a full-color projector.

(11) In the projector according to (10) mentioned above, the rotating prism being arranged to be movable when the shielding member is located at the extended position and being arranged to be stationary with a surface of the rotating prism on a light source apparatus side being vertical to the optical axis of illumination when the shielding member is located at the setback position.

In accordance with such a structure, when the shielding member is arranged to be located at the extended position in the optical path, rotating the rotating prism allows a smooth moving picture display of good quality to be provided. On the other hand, when the shielding member is arranged to be located at the setback position out of the optical path, the rotating prism is stationary with a surface thereof on the light source apparatus side being vertical to the optical axis of illumination, so that, generally, no illuminating light bundle is unnecessarily refracted on the light transmitting surface of the rotating prism. This allows deterioration in quality of an image to be reduced.

(12) In the projector according to (10) or (11) mentioned above, the projector further includes a sensor for detecting a rotating angle of the rotating prism.

Such a structure allows the rotating prism to be rotated at a proper rotating speed and phase. Accordingly, when a smooth moving picture display of good quality is required, the illuminating light bundle can be well scanned in the image forming area of the electrooptic modulating apparatus synchronously with a screen writing frequency of the electrooptic modulating apparatus, so that quality of a moving picture can be enhanced. Further, when a stationary picture is displayed or the brightness of a screen has priority over the smoothness in displaying a moving picture, movement of the rotating prism can be stopped at a proper angle position at which a surface of the rotating prism on the light source apparatus side is vertical to the optical axis of illumination. This allows, generally, no illuminating light bundle to be unnecessarily refracted on the light transmitting surface of the rotating prism, so that deterioration in quality of an image can be further restrained effectively.

(13) In the projector according to any of (10) to (12) mentioned above, an anti-reflection film being formed on a light transmitting surface of the rotating prism.

Such a structure enables the transmittance of light of the rotating prism to be enhanced. Accordingly, deterioration in the efficiency in using light can be minimized while lowering of the level of stray light allows contrast to be enhanced.

BRIEF DESCRIPTION OF THE DRAWINGS

FIG. 7(a) and FIG. 7(b) are schematics of a shielding member of a projector in another exemplary embodiment;

DETAILED DESCRIPTION OF EMBODIMENTS

Figure 1A:
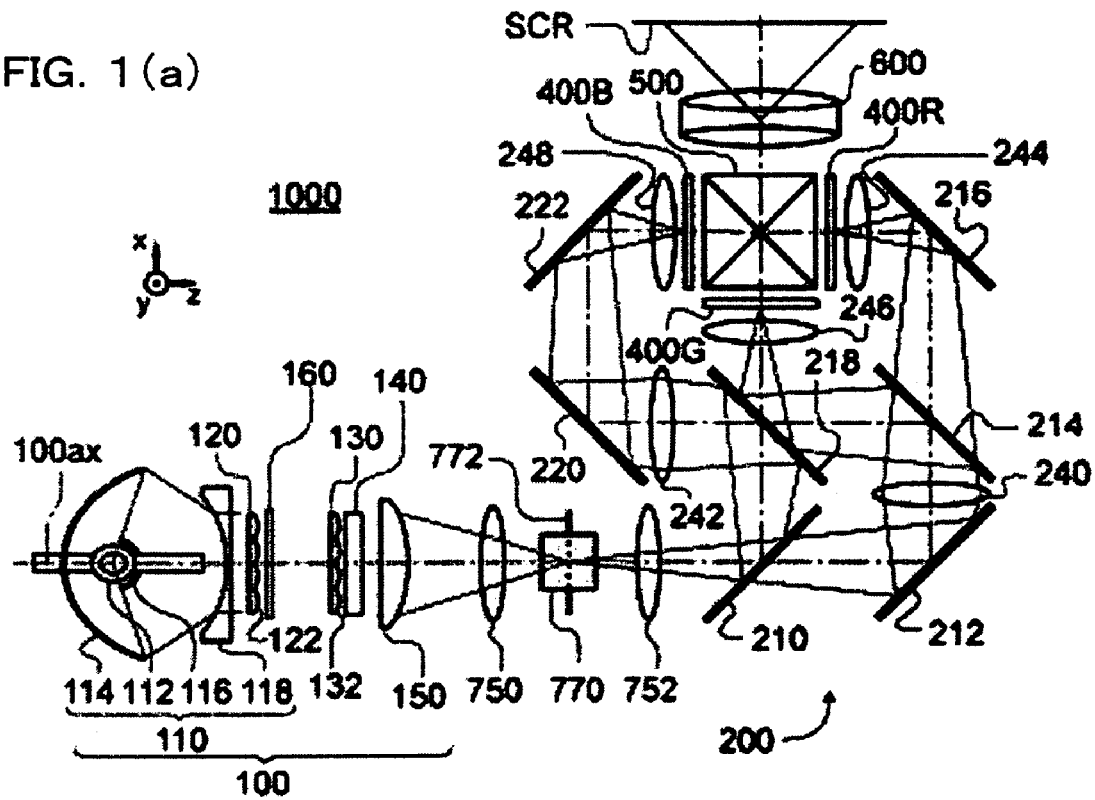
FIG. 1(a) and FIG. 1(b) are schematics of an optical system of a projector in an exemplary embodiment.

A projector in accordance with exemplary embodiments of the invention will be described hereinafter on the basis of exemplary embodiments illustrated in the drawings.

First Exemplary Embodiment

Figure 1B:
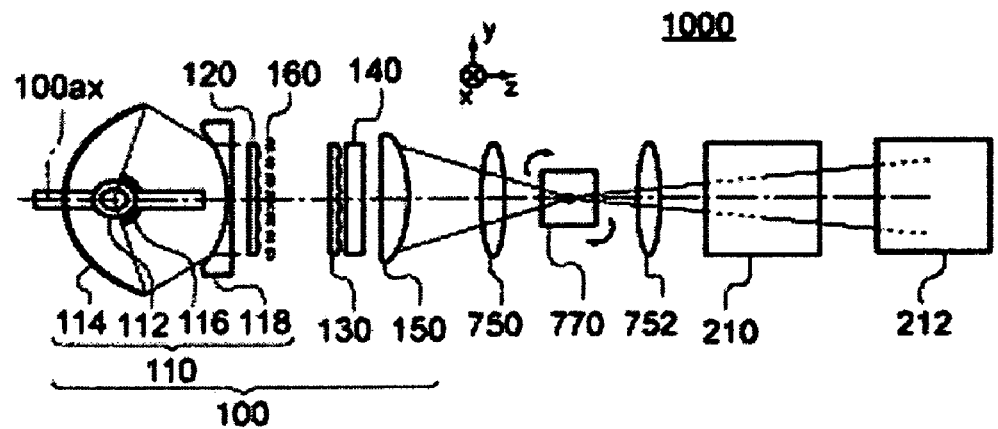

FIGS. 1(a)–1(b) illustrate an optical system of a projector in a first exemplary embodiment of the invention. FIG. 1(a) is a top view of the optical system. FIG. 1(b) is a side view of the optical system.

In the following description, mutually orthogonal three directions are respectively assumed to be a z direction (a direction of an optical axis of illumination in FIG. 1(a)), an x direction (a direction parallel to the sheet of the drawings and orthogonal to the z-axis in FIG. 1(a)) and a y direction (a direction vertical to the sheet and orthogonal to the z-axis in FIG. 1(a)).

A projector 1000 in the first exemplary embodiment is, as shown in FIGS. 1(a) and 1(b), a projector including: an illuminating apparatus 100; a color separating optical system 200 for separating an illuminating light bundle from the illuminating device 100 into three colored-light bundles of red, green and blue; three liquid crystal display devices 400R, 400G and 400B used as an electrooptic modulating apparatus for modulating each of the three colored-light bundles separated in the color separating optical system 200 on the basis of image information; a cross-dichroic prism 500 for compounding the colored-light bundles modulated by the three liquid crystal display devices 400R, 400G and 400B; and a projecting optical system 600 for projecting light compounded by the cross-dichroic prism 500 on a projecting surface such as a screen SCR.

Figure 2A:
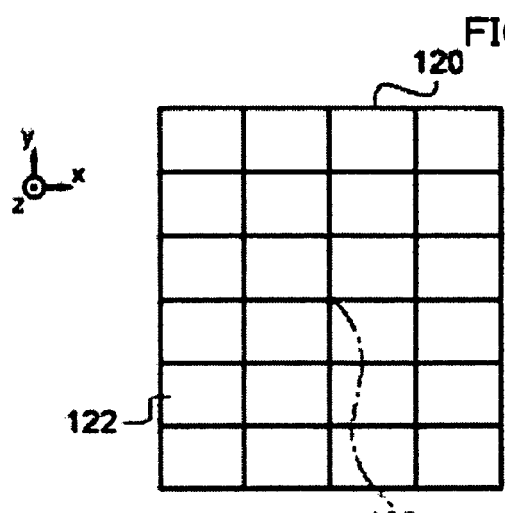
FIG. 2(a), FIG. 2(b) and FIG. 2(c) are schematics of a first lens array used for the projector in an exemplary embodiment.
Figure 2C:
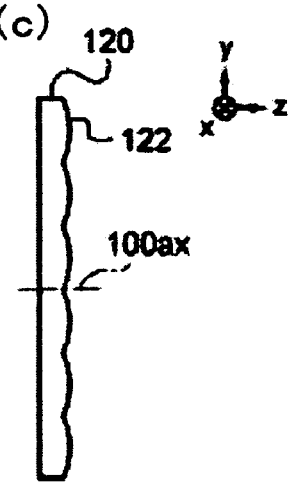
Figure 2B:
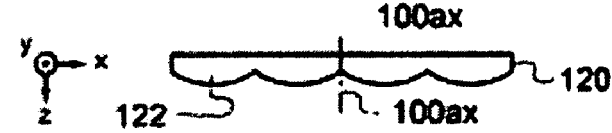

The illuminating apparatus 100 includes a light source apparatus 110 for emitting a substantially parallel illuminating light bundle to an illuminated area side, a first lens array 120 including a plurality of (4 rows×6 lines), relatively, small lenses 122 (refer to FIGS. 2(a)–2(c)) for dividing the illuminating light bundle from the light source apparatus 110 into a plurality of partial light bundles, a second lens array 130 including a plurality of small lenses 132 corresponding to the plurality of small lenses 122 in the first lens array 120, a polarization converting device 140 for converting the illuminating light bundle into a polarized light bundle and a superimposing lens 150 for superimposing the respective partial light bundles from the polarization converting device 140 in the illuminated area.

The light source apparatus 110 includes an elliptic surface reflector 114, a light-emitting tube 112 having a center of light emission in the vicinity of a first focal point of the elliptic surface reflector 114, a parallelizing lens 118 for converting the converged light from the elliptic surface reflector 114 into substantially parallel light. The light-emitting tube 112 is provided with an auxiliary mirror 116 as a reflecting device to reflect toward the elliptic surface reflector 114 the light emitted from the light-emitting tube 112 to the illuminated area side.

For the color separating optical system 200, used is an equivalent optical path optical system having optical paths of an equivalent length from the illuminating apparatus 100 to the liquid crystal display devices 400R, 400G and 400B.

For the liquid crystal display devices 400R, 400G and 400B, used is a liquid crystal display device having a planar shape of "a rectangle in which a longitudinal dimension in the y-axis direction:lateral dimension in the x-axis direction=3:4".

The projector 1000 in the first exemplary embodiment is characterized by using a shielding member 160 as an optical shutter and a rotating prism 770 as a scanning device. The shielding member 160 and the rotating prism 770 will be described, with reference to FIGS. 2(a)–(c), 3(a)–(d) and 4(a)–(c).

First, the shielding member 160 will be described, made reference to FIGS. 2(a)–(c) and 3(a)–(d).

Figure 3A:
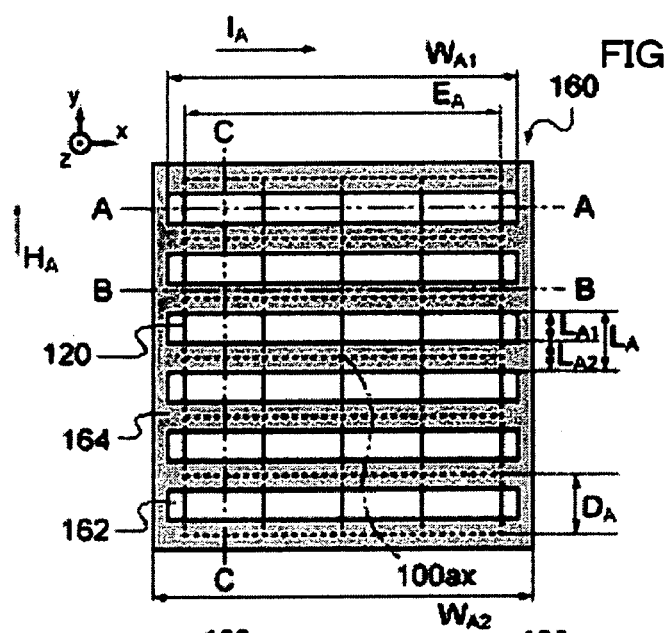
FIG. 3(a), FIG. 3(b), FIG. 3(c) and FIG. 3(d) are schematics of an arrangement of the first lens array and a shielding member.
Figure 3D:
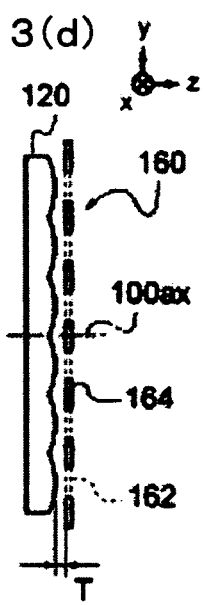
Figure 3B:
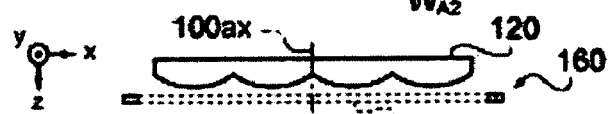
Figure 3C:
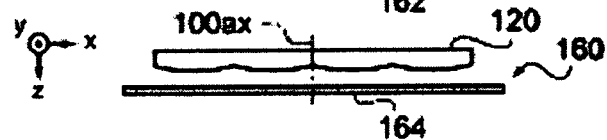
Figure 4A:
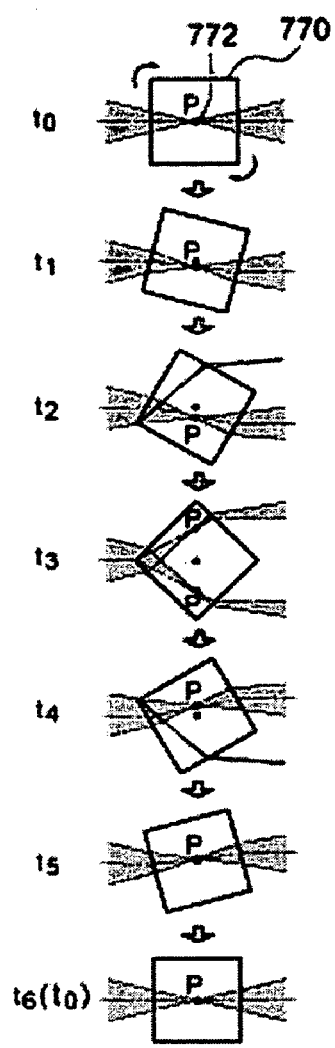
FIG. 4(a), FIG. 4(b) and FIG. 4(c) are schematics showing a relation between rotation of a rotating prism and a state of illumination on the liquid crystal display device.
Figure 4B:
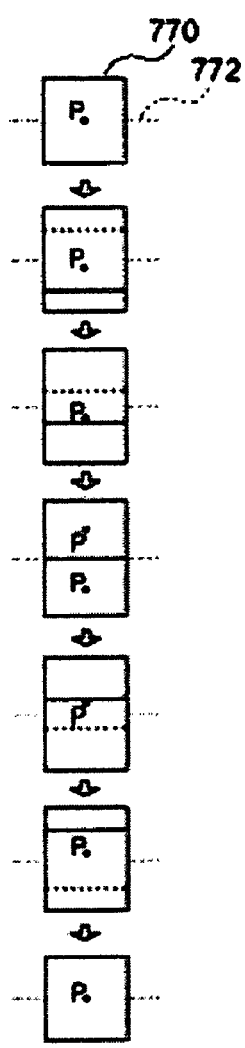
Figure 4C:
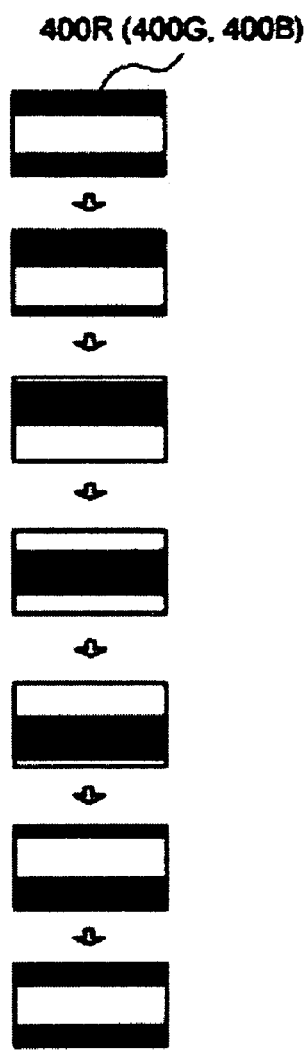

FIGS. 2(a)–(c) illustrate the first lens array used for the projector in the first exemplary embodiment. FIG. 2(a) is a front view of the first lens array from the illuminated area side. FIG. 2(b) is a top view of FIG. 2(a). FIG. 2(c) is a left side view of FIG. 2(a). FIGS. 3(a)–(d) illustrate an arrangement of the first lens array and the shielding member. FIG. 3(a) is a front view of the arrangement of the first lens array and the shielding member from the illuminated area side. FIG. 3(b) is a sectional view along a line A—A in FIG. 3(a). FIG. 3(c) is a sectional view along a line B—B in FIG. 3(a). FIG. 3(d) is a sectional view along a line C—C in FIG. 3(a).

The projector 1000 in the first exemplary embodiment includes the shielding member 160 in which a light transmitting area 162 and a light non-transmitting area 164 are alternately provided in the vicinity of a light-emitting surface of the first lens array 120 in a first direction HA vertical to an optical axis of illumination $100_{ax}$, as shown in FIGS. 3(a)–(d).

In the projector 1000 in the first exemplary embodiment, the, relatively, small lens 122 of the first lens array 120 has a planar shape of "a rectangle in which a longitudinal dimension in the y-axis direction:lateral dimension in the x-axis direction=3:4", as shown in FIG. 2(a). Moreover, the above-mentioned shielding member 160 is also provided in the vicinity of the light-emitting surface of the first lens array as shown in FIG. 3(a), so that the planar shape of a light radiated area in image forming areas of the liquid crystal display devices 400R, 400G and 400B is of "a rectangle in which a longitudinal dimension in the y-axis direction: lateral dimension in the x-axis direction=3:8".

Accordingly, the first lens array 120 converts the illuminating light bundle from the light source apparatus 110 into an illuminating light bundle having a sectional shape in which the illuminating light illuminates the whole image forming areas of the respective liquid crystal display devices 400R, 400G and 400B in a lateral direction along the x-axis direction and in which the illuminating light illuminates a part of (about a half of) the image forming areas in a longitudinal direction along the y-axis direction.

In the projector 1000 in the first exemplary embodiment, it is arranged that a relation of T<2 mm be satisfied, where T is a space between the shielding member 160 and the first lens array 120, as illustrated in FIG. 3(d).

In the first lens array 120, the second lens array 130 and the superimposing lens 150, which are used as a lens integrator optical system for converting an illuminating light bundle from the light source apparatus 110 into an evener light bundle, the respective, relatively, small lenses 122 of the first lens array 120 are provided conjugately with the liquid crystal display devices 400R, 400G and 400B. Accordingly, the shielding member 160 is preferably provided in the vicinity of a light-emitting surface of the first lens array 120 in order to alternately scroll the light radiated area and the light unradiated area in the image forming areas of the liquid crystal display devices 400R, 400G and 400B. From this point of view, it is preferable to satisfy a relation of T<2 mm, more preferably, to satisfy a relation of T<1 mm.

On the other hand, when the space T is too narrow, it is difficult to provide the shielding member 160 with a predetermined space between the shielding member 160 and the light-emitting surface of the first lens array 120. From this point of view, it is preferable to satisfy a relation of T>0.1 mm. Further, it can be considered to be more preferable to satisfy a relation of T>0.2 mm.

In the projector 1000 in the first exemplary embodiment, as shown in FIG. 3(a), a relation of $L_A=D_A$ is satisfied, where $L_A$ denotes a pitch to arrange the light transmitting area 162 and the light non-transmitting area 164 in the shielding member 160 in the first direction $H_A$, and $D_A$ denotes a pitch to arrange the small lens array 122 of the first lens array 120 in the first direction $H_A$. This allows rotation of the rotating prism 770 to cause the light radiated area and the light unradiated area to be clearly separated in the image forming areas of the liquid crystal display devices 400R, 400G and 400B for good scrolling.

In the projector 1000 in the first exemplary embodiment, a relation of $L_{A1}=L_{A2}=L_A/2$ is satisfied, where $L_{A1}$ denotes a length of the light transmitting area 162 in the shielding member 160 in the first direction $H_A$, and $L_{A2}$ denotes a length of the light non-transmitting area 164 in the first direction $H_A$, as shown in FIG. 3(a). This allows rotation of the rotating prism 770 to cause the light radiated area and the light unradiated area to be alternately scrolled at a time density of 50% in the image forming areas of the liquid crystal display devices 400R, 400G and 400B, so that the projector can achieve a moving picture display of good quality, and thereby, be good in balance without largely deteriorating the efficiency in using light.

In the projector 1000 in the first exemplary embodiment, as shown in FIG. 3(a), a relation of $W_{A1} \geq E_A$ and $W_{A2} > E_A$ is satisfied, where $W_{A1}$ denotes a length of the light transmitting area in the shielding member 160 in a second direction $I_A$ vertical to the first direction $H_A$, $W_{A2}$ denotes a length of the light non-transmitting area in the second direction $I_A$, and $E_A$ denotes a length of the lens array portion of the first lens array 120 in the second direction $I_A$. This allows the light radiated area and the light unradiated area to be formed for whole width of the image forming areas of the liquid crystal display devices 400R, 400G and 400B.

In the projector 1000, in the first exemplary embodiment, slits are provided in a predetermined pattern on an opaque base material to form the shielding member 160. This allows the shielding member 160 to be manufactured in a comparatively simple method. Further, the light transmitting area 162 of the shielding member 160 includes an air layer, so that the transmittance of light is enhanced, and thereby, deterioration in the efficiency in using light can be minimized while the level of stray light can be lowered to enhance contrast.

The shielding member 160 may be formed from a metal film or a dielectric multi-layered film, which is formed on a transparent base material in a predetermined pattern, as a light non-transmitting member. Such a structure also allows the shielding member to be manufactured in a comparatively simple method. In addition, a light-resistant characteristic of the light non-transmitting area in the shielding member can be enhanced.

In the projector 1000 in the first exemplary embodiment, the elliptic surface reflector 114 is used as a reflector as described above. This allows the light from the light-emitting tube 112 to be once narrowed and paralleled by the elliptic surface reflector 114. Accordingly, differently from a case of using a paraboloid reflector, it is possible to reduce in size the optical elements such as the respective optical elements of the illuminating apparatus, which are provided after the light source apparatus 110, (the first lens array 120, the second lens array 130, the polarization converting device 140 and the superimposing lens 150), the color separating optical system 200, the liquid crystal display devices 400R, 400G and 400B, the cross-dichroic prism 500 and a projecting lens 600, so that the projector can be miniaturized.

In the projector 1000 in the first exemplary embodiment, the light-emitting tube 112 is provided with an auxiliary mirror 116 as the reflecting device to reflect toward the elliptic surface reflector 114 the light emitted from the light-emitting tube 112 to the illuminated area side, as described above. This causes the light radiated from the light-emitting tube 112 to the illuminated area side to be reflected on the auxiliary mirror 116 toward the elliptic surface reflector 114, so that a size of the elliptic surface reflector 114 is not necessary to be set at a size capable of covering an end of the light-emitting tube 112 on the illuminated area side. This allows the elliptic surface reflector 114 to be miniaturized, and thereby, the projector to be miniaturized as a result.

In the projector 1000 in the first exemplary embodiment, all of the respective optical distances from the shielding member 160 to the plural liquid crystal display devices 400R, 400G and 400B are arranged to be equal as shown in FIG. 1(*a*). This allows an equivalent scroll system to be provided for every colored-light bundle, so that a full-color display with a good color reproducing characteristic can be achieved.

Next, the rotating prism 770 will be described, made reference to FIGS. 1(*a*)–(*b*) and 4(*a*)–(*c*).

FIGS. 4(*a*)–(*c*) illustrate a relation between rotation of the rotating prism and a state of illumination on the liquid crystal display device. FIG. 4(*a*) is a side view of the rotating prism along its rotating axis. FIG. 4(*b*) is a front view of the rotating prism along an optical axis of illumination. FIG. 4(*c*) is a front view showing an illumination state of the illuminating light bundle in the image forming area of the liquid crystal display device.

In the projector 1000 in the first exemplary embodiment, as shown in FIGS. 1(*a*)–(*b*), the rotating prism 770 is provided between the illuminating apparatus 100 and the color separating optical system 200 conjugately with the liquid crystal display devices 400R, 400G and 400B. The rotating prism 770 has a function of scanning an illuminating light bundle in the y-axis direction in the image forming area synchronously with a screen writing frequency of the liquid crystal display devices 400R, 400G and 400B by rotating about a rotating axis 772 vertical to the optical axis of illumination 100*ax*.

In FIGS. 4(*a*) and 4(*b*), an image P at a virtual center point of the first lens array 120 in the optical axis of illumination 100*ax* is scrolled in the vertical direction with the rotating axis 772 of the rotating prism 770 being a center in accordance with rotation of the rotating prism 770. As a result, as shown in FIG. 4(*c*), when the rotating prism 770 rotates, the light radiated area and the light unradiated area are alternately scrolled in the image forming areas of the liquid crystal display devices 400R, 400G and 400B.

Thus, in accordance with the projector 1000 in the first exemplary embodiment, the light radiated area and the light unradiated area are moved by turns in the image forming areas of the liquid crystal display devices 400R, 400G and 400B. This results in moderation of the persistence, so that a projector capable of achieving a smooth moving picture display of good quality can be obtained.

Moreover, in accordance with the projector 1000 in the first exemplary embodiment, the shielding member 160 is provided before color separation of the illuminating light bundle, so that only one shielding member 160 (and one rotating prism 770) is required although there are plural liquid crystal display devices. This helps prevent the projector, as much as possible, from being manufactured large.

Therefore, the projector 1000 in the first exemplary embodiment can be a projector having a structure capable of easy miniaturization while also being capable of achieving a smooth moving picture display of good quality.

In the projector 1000, in the first exemplary embodiment, the rotating prism 770 has the rotating axis 772 vertical to the optical axis of illumination 100*ax*. This allows a smooth scrolling operation between the light radiated area and the light unradiated area to be achieved in the image forming areas of the respective liquid crystal display devices 400R, 400G and 400B in a full-color projector.

In the projector 1000, in the first exemplary embodiment, an anti-reflection film is formed on a light transmitting surface of the rotating prism 770. This allows transmittance of the rotating prism 770 to be enhanced, and thereby, deterioration in the efficiency in using light can be minimized while the level of stray light can be lowered to enhance contrast.

Second Exemplary Embodiment

Figure 5A:
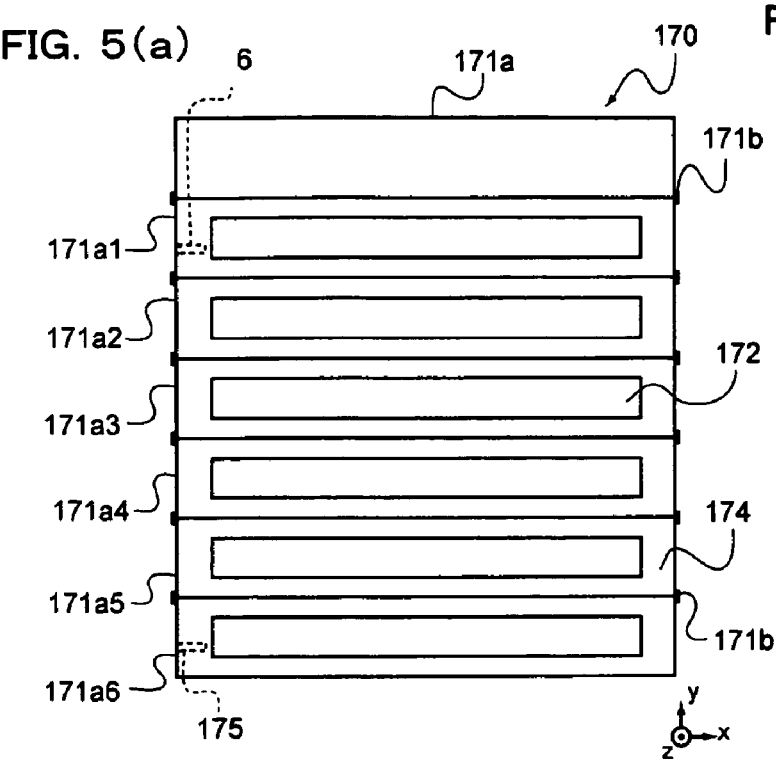
FIG. 5(a) and FIG. 5(b) are schematics of a shielding member of a projector in another exemplary embodiment.
Figure 5B:
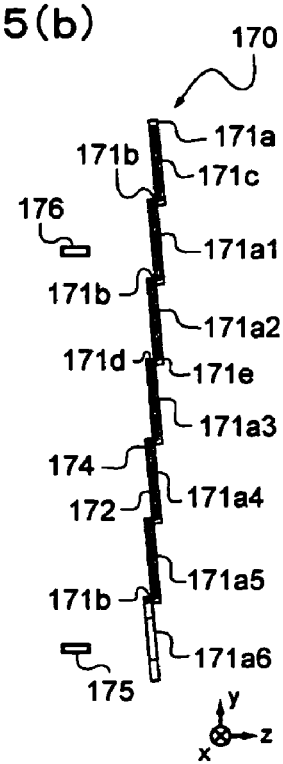
Figure 6A:
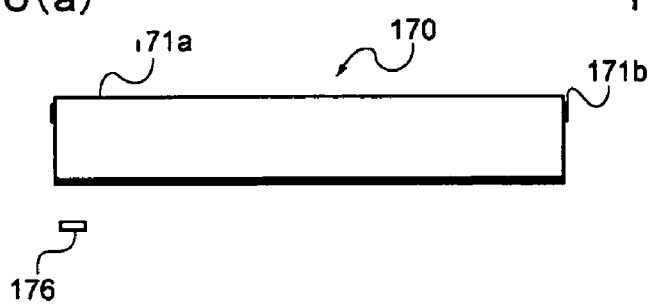
FIG. 6(a) and FIG. 6(b) are schematics of a shielding member of a projector in another exemplary embodiment.
Figure 6B:
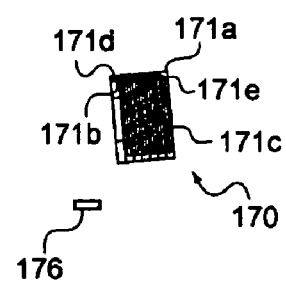
Figure 6B:
Figure 6B:
Figure 6B:
Figure 6B:

FIGS. 5(*a*)–(*b*) illustrate shielding member of a projector in a second exemplary embodiment. FIG. 5(*a*) is a front view of the extended shielding member from an illuminated area side. FIG. 5(*b*) is a left side view of FIG. 5(*a*). FIGS. 6(*a*)–(*b*) illustrate a shielding member of a projector in the second exemplary embodiment. FIG. 6(*a*) is a front view of the retracted shielding member from an illuminated area side. FIG. 6(*b*) is a left side view of FIG. 6(*a*).

A projector (not shown), in the second exemplary embodiment is characterized in that a shielding member is arranged to be extendable and retractable.

That is to say, a shielding member 170 includes six elements 171*a*1, 171*a*2, . . . and 171*a*6, in which a light transmitting area 172 and a light non-transmitting area 174 are formed. The shielding member 170 is arranged to move the six elements 171*a*1, 171*a*2, . . . and 171*a*6 in parallel for extension to extend to an extended position in a optical path as illustrated in FIGS. 5(*a*)–(*b*), and for retraction to be set back to a setback position out of the optical path as illustrated in FIGS. 6(*a*)–(*b*).

In the projector, in the second exemplary embodiment, two elements adjacent each other among the six elements 171*a*1, 171*a*2, . . . and 171*a*6 are connected by a link 171*b* as shown in FIGS. 5(*a*)–(*b*) and 6(*a*)–(*b*). The element 171*a*1 is also connected to a fixed base 171*a* by the link 171*b*. On both sides of the respective elements 171*a*1, 171*a*2, . . . and 171*a*5 and the base 171*a*, provided are guide grooves 171*c* extending in a direction of extension and retraction of the shielding member 170. On both ends of the respective links 171*b*, provided are first pivot pins 171*d* for fixing and second pivot pins 171*e* for moving, respectively. The first pivot pins 171*d* are provided on the upper end of the six elements 171*a*1, 171*a*2, . . . and 171*a*6 while the second pivot pins 171*e* are provided so as to be freely movable in the guide groove 171*c*.

The projector, in the second exemplary embodiment, includes a first sensor 175 for detecting an extension state of the shielding member 170 and a second sensor 176 for detecting a retraction state of the shielding member 170, as shown in FIGS. 5(*a*)–(*b*) and 6(*a*)–(*b*). An alarming apparatus (not shown) to provide an alarm is connected to the first sensor 175 and the second sensor 176.

Accordingly, when the shielding member 170 is not located at the extended or setback position, the alarm allows the light from the light source apparatus 110 not to be radiated. Thus, it is possible to prevent a bad influence on other optical components due to an undesirable scattering.

A structure of a rotating prism of the projector, in the second exemplary embodiment, is the same as that of the rotating prism of the projector 1000 in the first exemplary embodiment.

Therefore, in accordance with the projector, in the second exemplary embodiment, the light radiated area and the light unradiated area are alternately moved in the image forming areas of the liquid crystal display devices 400R, 400G and 400B. This results in moderation of the persistence, so that a projector capable of achieving a smooth moving picture display of good quality can be obtained.

Further, in accordance with the projector in the second exemplary embodiment, providing the shielding member 170 before color separation of an illuminating light bundle allows only one shielding member 170 (and one rotating prism 770) to be required although there are plural liquid crystal display devices. This helps prevent the projector, as much as possible, from being manufactured large.

Accordingly, the projector, in the second exemplary embodiment, can be a projector having a structure capable of easy miniaturization while also being capable of achieving a smooth moving picture display of good quality.

Moreover, in the projector, in the second exemplary embodiment, the rotating prism 770 (shown in FIG. 1) is arranged to be rotatable when the shielding member 170 is located at the extended position in the optical path while it is arranged to be stationary with a surface of the rotating prism 770 on the light source apparatus 110 side being vertical to the optical axis of illumination 100ax when the shielding member 170 is located at the setback position out of the optical path.

Accordingly, arranging the shielding member 170 to be located at the extended position in the optical path causes the rotating prism 770 to be rotated, so that, generally, a smooth moving picture display of good quality can be achieved. On the other hand, arranging the shielding member 170 to be located at the setback position causes the rotating prism 770 to be stationary with a surface of the rotating prism 770 on the light source apparatus 110 side being vertical to the optical axis of illumination 100ax, so that no illuminating light bundle is unnecessarily refracted on the light transmitting surface of the rotating prism 770. This allows deterioration in quality of an image to be reduced.

The projector, in the second exemplary embodiment, includes a sensor (not shown) to detect a rotating angle of the rotating prism 770 (not shown). This allows the rotating prism 770 to be rotated at a proper rotating speed and phase.

Accordingly, when a smooth moving picture display of good quality is required, the illuminating light bundle can be well scanned in the image forming areas of the liquid crystal display devices 400R, 400G and 400B synchronously with a screen writing frequency of the liquid crystal display devices 400R, 400G and 400B, so that quality of a moving picture can be enhanced. Further, when a stationary picture is displayed or the brightness of a screen has priority over the smoothness in displaying a moving picture, movement of the rotating prism 770 can be stopped at a proper angle position at which a surface of the rotating prism 770 on the light source apparatus 110 side is vertical to the optical axis of illumination 100ax. This allows, generally, no illuminating light bundle to be unnecessarily refracted on the light transmitting surface of the rotating prism 770, so that deterioration in quality of an image can be further effectively reduced.

Third Exemplary Embodiment

Figure 8A:
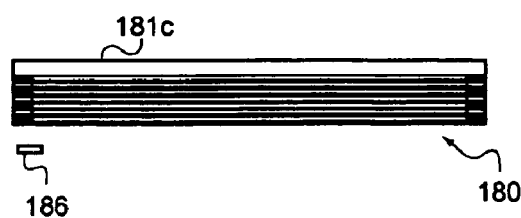
FIG. 8(a) and FIG. 8(b) are schematics of a shielding member of a projector in another exemplary embodiment.
Figure 8B:
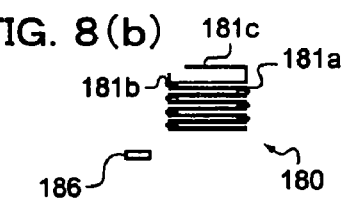

FIGS. 7(*a*)–(*b*) illustrate a shielding member of a projector in the third exemplary embodiment. FIG. 7(*a*) is a front view of the extended shielding member from an illuminated area side. FIG. 7(*b*) is a left side view of FIG. 7(*a*). FIGS. 8(*a*)–(*b*) illustrate a shielding member of a projector in the third exemplary embodiment. FIG. 8(*a*) is a front view of the retracted shielding member from an illuminated area side. FIG. 8(*b*) is a left side view of FIG. 8(*a*).

A projector (not shown), in the third exemplary embodiment, is characterized in that a shielding member is arranged to be extendable and retractable (developable and foldable).

That is to say, a shielding member 180 includes six elements 181*a*1, 181*a*2, . . . and 181*a*6, in which a light transmitting area 182 and a light non-transmitting area 184 are formed. The shielding member 180 is arranged to move the six elements 181*a*1, 181*a*2, . . . and 181*a*6 in parallel for extension to extend to an extended position in an optical path as shown in FIGS. 7(*a*)–(*b*) and for retraction to be set back to a setback position out of the optical path as shown in FIGS. (a)–(b).

In the projector, in the third exemplary embodiment, two elements adjacent each other among the six elements 181*a*1, 181*a*2, . . . and 181*a*6 are connected respectively by a hinge 181*b* as shown in FIGS. 7(*a*)–(*b*) and 8(*a*)–(*b*). Further, a light non-transmitting film (not shown) as a part of the light non-transmitting area 184 is provided between the adjacent two elements. The element 181*a*1 is also connected to a spacer 181*a* by the hinge 181*b*. The spacer 181*a* is connected to a fixed base 181*c* by the hinge 181*b*. The respective hinges 181*b* are provided on both sides of the shielding member 180.

The projector, in the third exemplary embodiment, includes a first sensor 185 for detecting an extension state of the shielding member 180 and a second sensor 186 for detecting a retraction state of the shielding member 180, as shown in FIGS. 7(*a*)–(*b*) and 8(*a*)–(*b*). An alarming apparatus (not shown) to provide an alarm is connected to the first sensor 185 and the second sensor 186.

Accordingly, in the case that the shielding member 180 is not located at the extended or setback position, the alarm allows the light from the light source apparatus 110 not to be radiated. Thus, it is possible to, generally, prevent a bad influence on other optical components due to an undesirable scattering.

A structure of a rotating prism of the projector in the third exemplary embodiment is same as that of the rotating prism of the projector 1000 in the first exemplary embodiment.

Therefore, in accordance with the projector in the third exemplary embodiment, the light radiated area and the light unradiated area are alternately moved in the image forming areas of the liquid crystal display devices 400R, 400G and 400B. This results in moderation of the persistence, so that a projector capable of achieving a smooth moving picture display of good quality can be obtained.

Further, in accordance with the projector in the third exemplary embodiment, providing the shielding member 180 before color separation of an illuminating light bundle allows only one shielding member 180 (and one rotating prism 770) to be required although there are plural liquid crystal display devices. This helps prevent the projector, as much as possible, from being manufactured large.

Accordingly, the projector, in the third exemplary embodiment, can be a projector having a structure capable of easy miniaturization while also being capable of achieving a smooth moving picture display of good quality.

Fourth Exemplary Embodiment

Figure 9A:
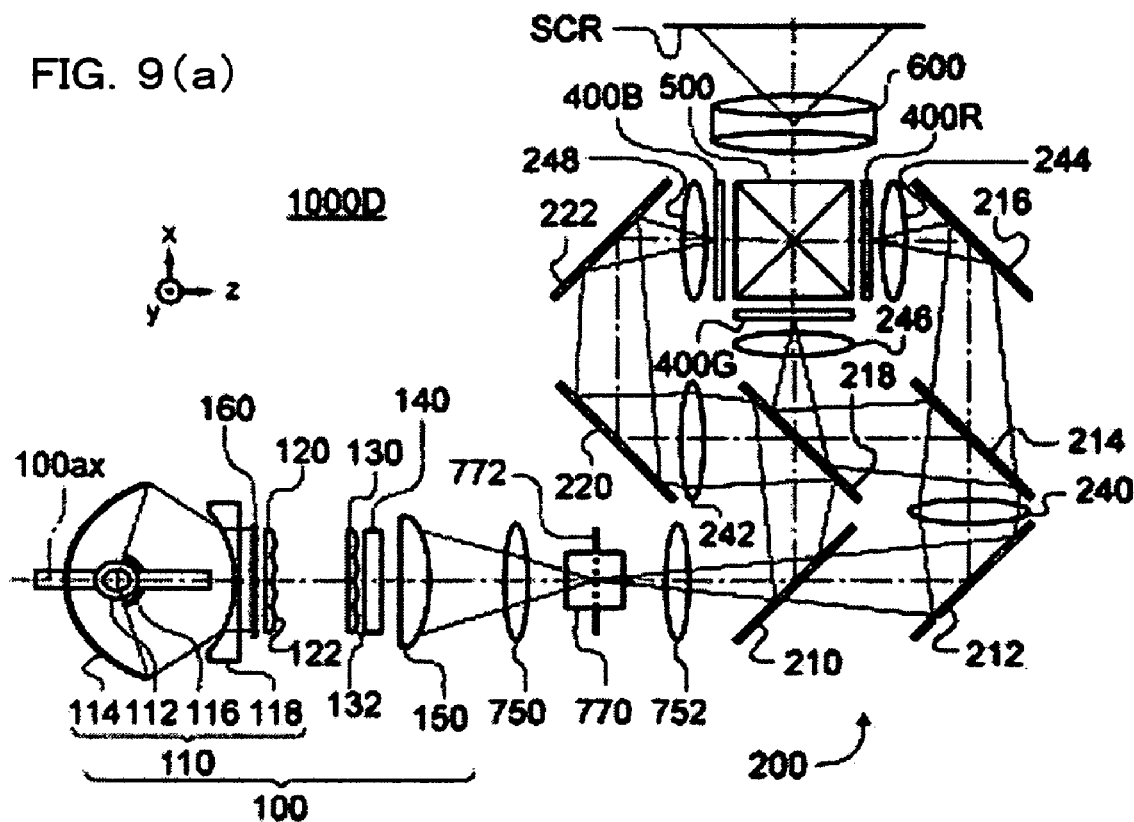
FIG. 9(a) and FIG. 9(b) are schematics of an optical system of a projector in another exemplary embodiment.
Figure 9B:
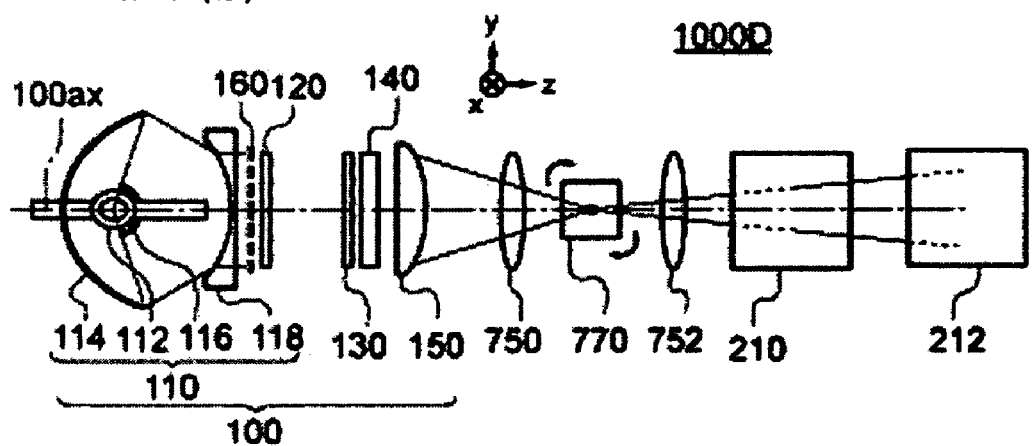

FIGS. 9(a)–(b) illustrate an optical system of a projector in the fourth exemplary embodiment. FIG. 9(a) is a top view of the optical system. FIG. 9(b) is a side view of the optical system. In FIG. 9, the components that are the same as those in FIGS. 1(a)–(b) are marked with the same reference numerals and signs.

A projector 1000D, in the fourth exemplary embodiment, is different from a projector 1000, in the first exemplary embodiment, in that the shielding member 160 is provided on a light incident surface side of the first lens array 120 as shown in FIG. 9(a)–(b).

The projector 1000D, in the fourth exemplary embodiment, however, has a structure similar to that of the projector 1000 in the first exemplary embodiment in points other than the above. Accordingly, it has the same effects as those of the projector 1000 in the first exemplary embodiment.

That is to say, the projector 1000D, in the fourth first exemplary embodiment, includes the shielding member 160 in which the light transmitting area 162 and the light non-transmitting area 164 are alternately provided in the optical path in the first direction vertical to the optical axis of illumination 100ax (refer to FIGS. (a)–(d)), so that the light radiated area and the light unradiated area are moved by turns in the image forming areas of the liquid crystal display devices 400R, 400G and 400B. This results in moderation of the persistence, so that a projector capable of achieving a smooth moving picture display of good quality can be obtained.

Further, the shielding member 160 having such an effect is provided before color separation of the illuminating light bundle, so that only one shielding member 160 (and one rotating prism 770) is required although there are plural liquid crystal display devices. This helps prevent the projector, as much as possible, from being manufactured large.

Therefore, the projector 1000D, in the fourth exemplary embodiment, can be a projector having a structure capable of easy miniaturization although the projector is capable of achieving a smooth moving picture display of good quality.

Moreover, in the projector 1000D, in the fourth exemplary embodiment, the shielding member 160 is provided so as to be able to extend and retract between the extended position in the optical path and the setback position out of the optical path. Accordingly, when a smooth moving picture display of good quality is required, the shielding member 160 can be moved to the extended position in the optical path to achieve a smooth moving picture display of good quality. When a stationary picture is displayed or the brightness of a screen has priority over the smoothness in displaying a moving picture, moving the shielding member 160 to the setback position out of the optical path allows a bright display screen to be achieved without largely lowering the efficiency in using light.

Fifth Exemplary Embodiment

Figure 10A:
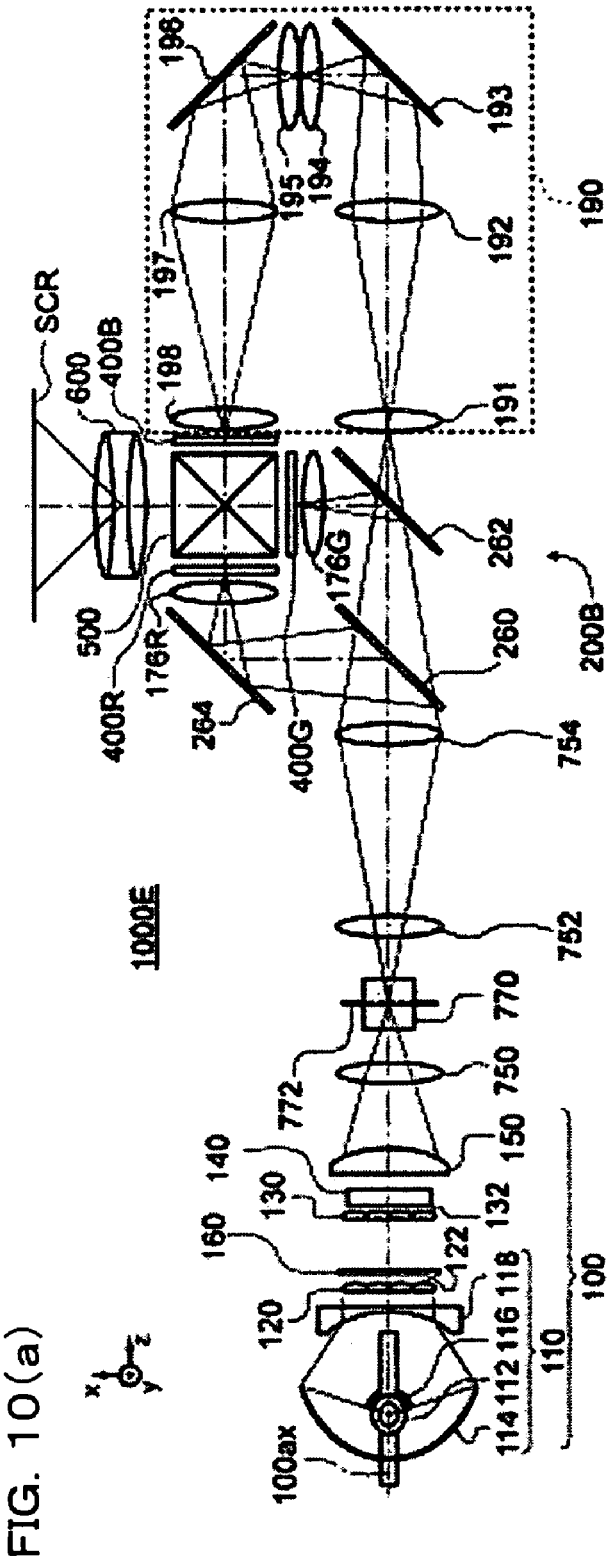
FIG. 10(a) and FIG. 10(b) are schematics of an optical system of a projector in another exemplary embodiment.
Figure 10B:
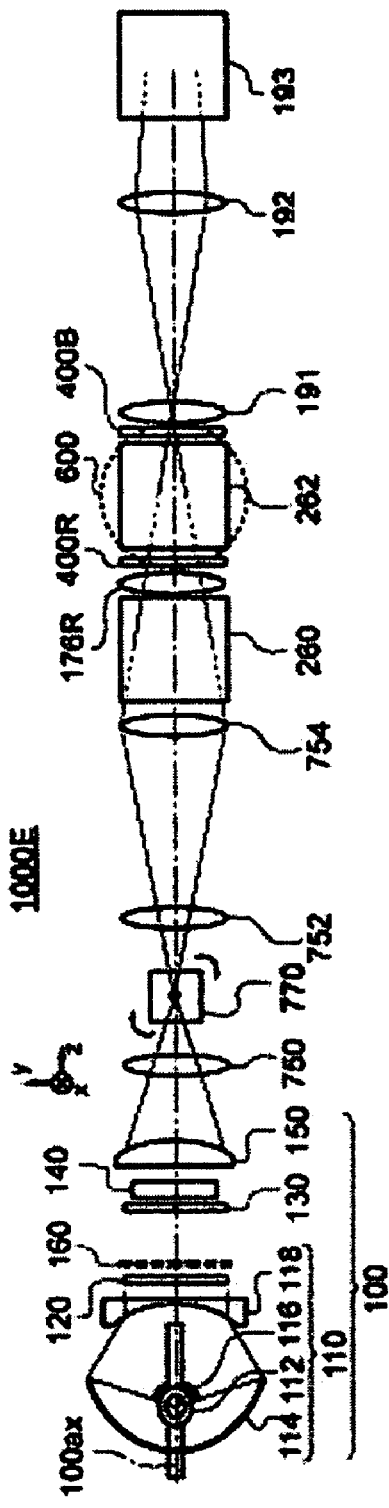
Figure 11A:
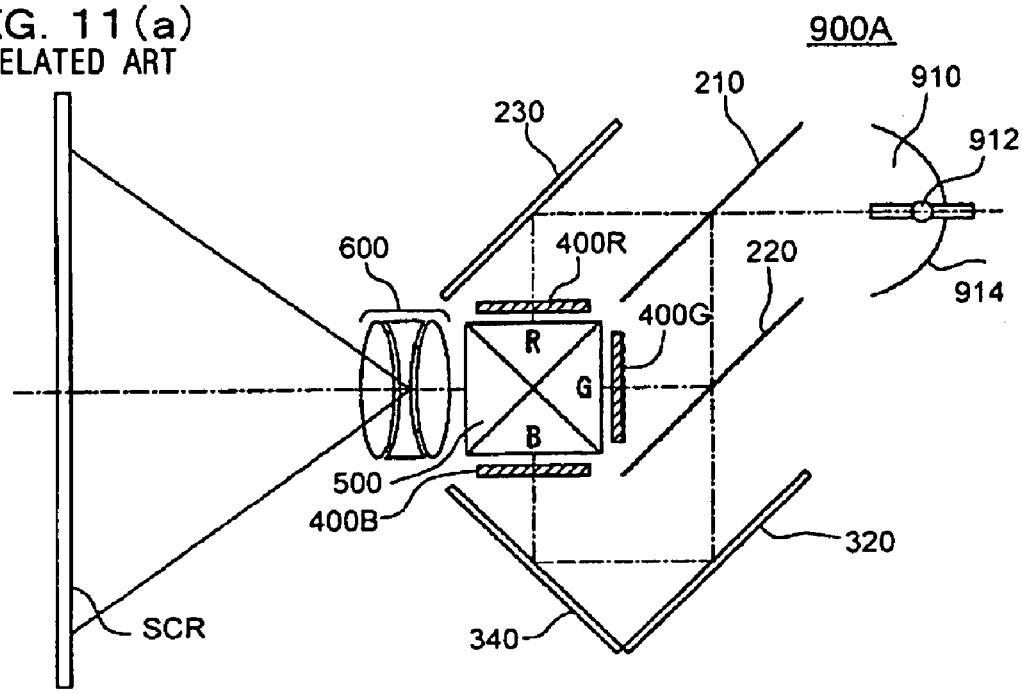
FIG. 11(a) is a schematic of a related art projector.
Figure 11B:
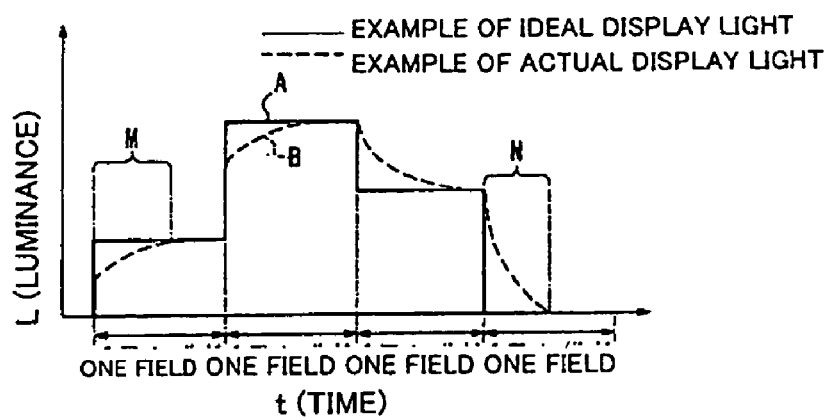
FIG. 11(b) and FIG. 11(c) are schematics of a problem of the related art projector.
Figure 11C:
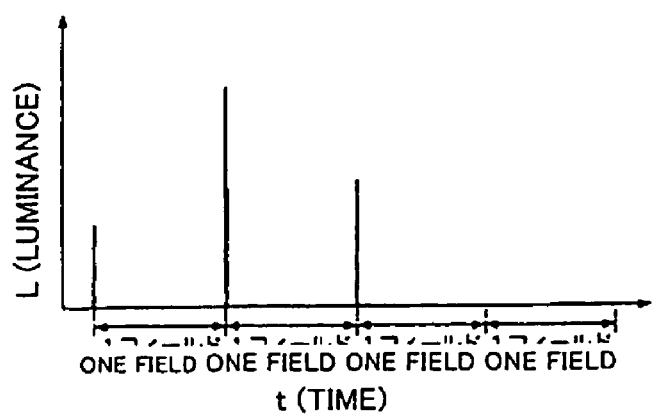
Figure 12A:
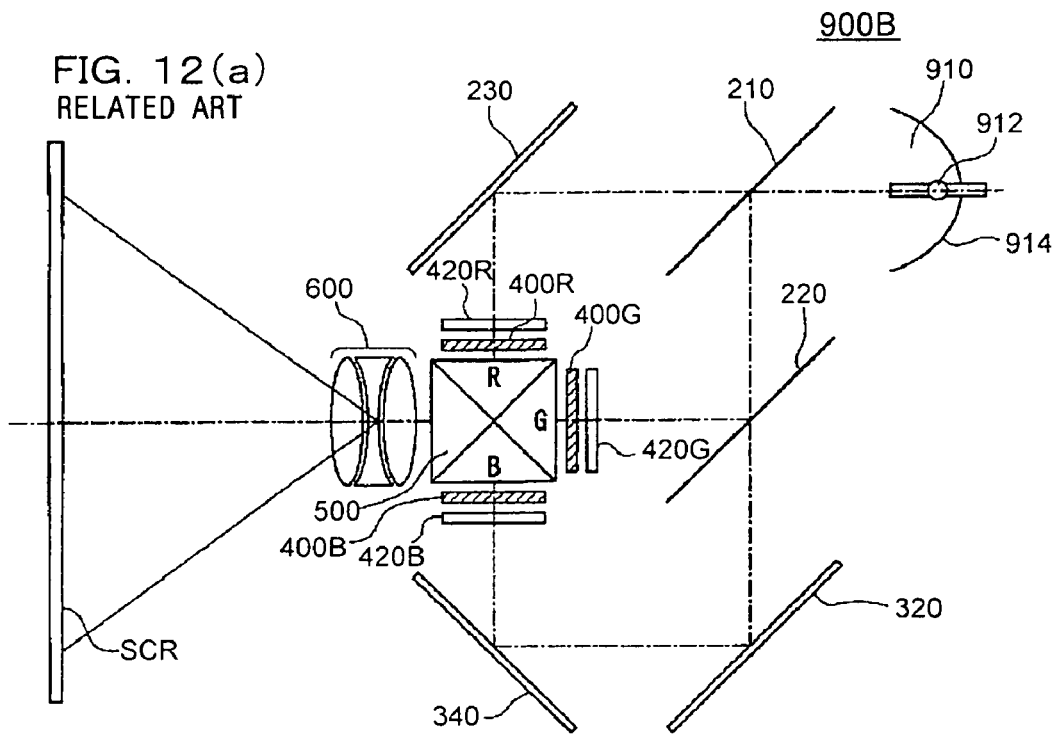
FIG. 12(a), FIG. 12(b) and FIG. 12(c) are schematics of another related art projector.
Figure 12B:
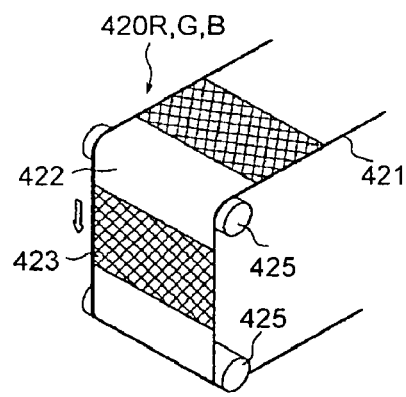
Figure 12C:
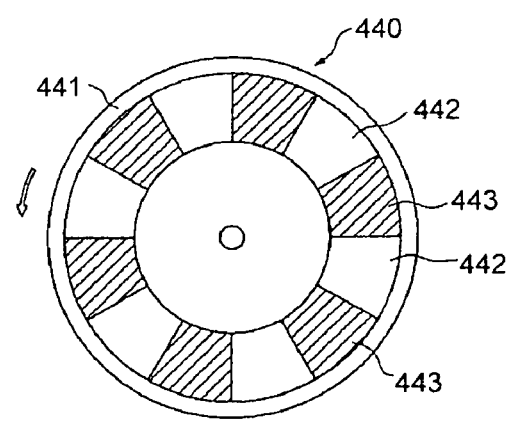

FIGS. 10(a)–(b) illustrate an optical system of a projector in a fifth exemplary embodiment. FIG. 10(a) is a top view of the optical system. FIG. 10(b) is a side view of the optical system. In FIGS. 10(a)–(b), the components that are the same as those in FIGS. 1(a)–1(b) are marked with the same reference numerals and signs.

A projector 1000E, in the fifth exemplary embodiment, is different from a projector 1000, in the first exemplary embodiment, in that a color separating optical system 200B including a double relay optical system shown in FIG. 10(a) is used as a color separating optical system.

The projector 1000E, in the fifth exemplary embodiment, however, has a structure similar to that of the projector 1000, in the first exemplary embodiment, in points other than the above. Accordingly, it has the same effects as those of the projector 1000 in the first exemplary embodiment.

That is to say, the projector 1000E, in the fifth exemplary embodiment, includes the shielding member 160 in which the light transmitting area 162 and the light non-transmitting area 164 are alternately provided in the optical path in the first direction vertical to the optical axis of illumination 100ax, so that the light radiated area and the light unradiated area are moved by turns in the image forming areas of the liquid crystal display devices 400R, 400G and 400B. This results in moderation of the persistence, so that a projector capable of achieving a smooth moving picture display of good quality can be obtained.

Further, the shielding member 160 having such an effect is provided before color separation of the illuminating light bundle, so that only one shielding member 160 (and one rotating prism 770) is required although there are plural liquid crystal display devices. This helps prevent the projector, as much as possible, from being manufactured large.

Therefore, the projector 1000E, in the fifth exemplary embodiment, can be a projector having a structure capable of easy miniaturization while also being capable of achieving a smooth moving picture display of good quality.

Moreover, in the projector 1000E, in the fifth exemplary embodiment, the shielding member 160 is provided so as to be able to extend and retract between the extended position in the optical path and the setback position out of the optical path. Accordingly, when a smooth moving picture display of good quality is required, the shielding member 160 can be moved to the extended position in the optical path to achieve a smooth moving picture display of good quality. When a stationary picture is displayed or the brightness of a screen has priority over the smoothness in displaying a moving picture, moving the shielding member 160 to the setback position out of the optical path allows a bright display screen to be achieved without largely lowering the efficiency in using light.

The projector in accordance with exemplary embodiments of the invention has been described above on the basis of the above-mentioned respective exemplary embodiments. The exemplary embodiments of the invention are, however, not limited to the above respective exemplary embodiments. The exemplary embodiments of the invention can be carried out in various modes within a scope not departing from the substance thereof. The following modifications may be possible, for example.

(1) In the above description, the shielding member 160 is fixed in the first exemplary embodiment while the shielding members 170 and 180 are arranged to be extendable and retractable in the second and third exemplary embodiments. The whole shielding member may, however, move in exemplary embodiments of the invention. In this case, the shielding member is arranged to move in whole to extend or be set back between the extended position in the optical path and the setback position out of the optical path. Therefore, when a smooth moving picture display of good quality is required, moving the whole shielding member to the extended position in the optical path allows a smooth moving picture display of good quality to be obtained. Further, when a stationary picture is displayed or the brightness of a screen has priority over the smoothness in displaying a moving picture, moving the whole shielding member to the setback position out of the optical path allows a bright display screen to be achieved without largely lowering the efficiency in using light.

(2) In the above-mentioned respective exemplary embodiments, described is a case that the scanning device refers to the rotating prism 770. In exemplary embodiments of the invention, however, other scanning devices may be used instead of the rotating prism. As the other scanning devices, a galvano-mirror or a polygon mirror may be used, for example.

(3) In the above-mentioned respective exemplary embodiments, the projectors are of a transmission type. Exemplary embodiments of the invention may be applicable, however, to a reflection type of projector. The "transmission type" in the above context means that an electrooptic modulating apparatus, used as an optically modulating device, is of a type that light is transmitted therethrough, such as a transmission type of liquid crystal display device. On the other hand, the "reflection type" device of an electrooptic modulating apparatus used as the optically modulating device is of a type of reflecting light, such as a reflection type of liquid crystal display device. In the case of applying exemplary embodiments of the invention to a reflection type of projector, similar effects to a transmission type of projector can also be obtained.

(4) In the projectors in the respective exemplary embodiments mentioned above, a liquid crystal display device is used as an electrooptic modulating apparatus, but exemplary embodiments of the invention are not limited to the above. Generally, any device or apparatus can be used as an electrooptic modulating apparatus so long as incident light is modulated in accordance with the image information in the device or apparatus. A micro-mirror type of optical modulating apparatus or the like may be used for the above. For the micro-mirror type of optical modulating apparatus, a DMD (digital micro-mirror device) (a trademark of the TI company) can be used, for example.

(5) In the projector in the above-mentioned respective exemplary embodiments, for the liquid crystal display device, used is a liquid crystal display device having an image forming area in a planar shape of "a rectangle in which a longitudinal dimension in the y-axis direction: lateral dimension in the x-axis direction=3:4". The exemplary embodiments of the invention are, however, not limited to the above. A liquid crystal display device for wide vision, which has a planar shape of "a rectangle in which a longitudinal dimension in the y-axis direction:lateral dimension in the x-axis direction=9:16", and such may be used, for example. In this case, used are the respective, relatively, small lenses 122 of the first lens array 120, which have a planar shape of "a rectangle in which a longitudinal dimension in the y-axis direction:lateral dimension in the x-axis direction=9:16", and such instead of the lenses having a planar shape of "a rectangle in which a longitudinal dimension in the y-axis direction:lateral dimension in the x-axis direction=3:4".

(6) In the projector in the above-mentioned respective exemplary embodiments, for the light source apparatus 110, used is a light source apparatus including an elliptic surface reflector 114, a light-emitting tube 112 having a center of light emission in the vicinity of a first focal point of the elliptic surface reflector 114 and a parallelizing lens 118. The exemplary embodiments of the invention are, however, not limited to the above. A light source apparatus, which includes a paraboloid reflector and a light-emitting tube having a center of light emission in the vicinity of a focal point of the paraboloid reflector, may be also used preferably.

What is claimed is:

1. A projector comprising: a light source apparatus to emit a substantially parallel illuminating light bundle to an illuminated area;
   a first lens array having a plurality of lenses to divide the illuminating light bundle emitted from the light source apparatus into a plurality of partial light bundles;
   a second lens array having a plurality of lenses corresponding to the plurality of lenses of the first lens array;
   a superimposing lens to superimpose the respective partial light bundles from the second lens array in the illuminated area;
   a color separating optical system to separate the light bundle from the superimposing lens into light bundles corresponding to a plurality of colored light;
   a plurality of electrooptic modulating apparatuses to modulate the light bundles separated by the color separating optical system in accordance with respective image information;
   a projecting optical system to project a light bundle modulated by the plurality of electrooptic modulating apparatuses;
   a shielding member in the vicinity of a light emitting surface or a light incident surface of the first lens array, in which a light transmitting area and a light non-transmitting area are alternately arranged in an optical path in a first direction vertical to an optical axis of illumination; and
   a scanning device provided between the superimposing lens and the color separating optical system, to scan an illuminating light bundle in an image forming area of the electrooptic modulating apparatus in the first direction synchronously with a screen writing frequency of the electrooptic modulating apparatus.

2. The projector according to claim 1,
   the shielding member being extendable and retractable between an extended position in the optical path and a setback position out of the optical path.

3. The projector according to claim 2,
   the shielding member being arranged to move in whole to at least one of extend and retract between the extended position and the setback position.

4. The projector according to claim 2,
   the shielding member further comprising:
   a plurality of elements in which the light transmitting area and the light non-transmitting area are formed, and being arranged to extend and retract in whole so as to at least one of extend and retract between the extended position and the setback position.

5. The projector according to claim 2, further comprising:
   an alarm apparatus to provide an alarm when the shielding member is not located at least one of the extended position and the setback position.

6. The projector according to claim 1,
   T denoting a space between the shielding member and the first lens array, and satisfying a relation of 0.1 mm<T<2 mm.

7. The projector according to claim 1,
   L denoting a pitch to arrange the light transmitting area and the light non-transmitting area in the shielding member, D denoting a pitch to arrange a lens array portion of the first lens array along the first direction, and satisfying a relation of L=D.

8. The projector according to claim 7,
   $L_1$ denoting a length of the light transmitting area along the first direction, $L_2$ denoting a length of the light non-transmitting area along the first direction, and satisfying a relation of $L_1=L_2=L/2$.
9. The projector according to claim 1,
   $W_1$ denoting a length of the light transmitting area along a second direction vertical to the first direction, $W_2$ denoting a length of the light non-transmitting area along the second direction and E denoting a length of a lens array portion of the first lens array along the second direction, and satisfying a relation of $W_1 \geqq E$ and $W_2 > E$.
10. The projector according to claim 1, the scanning device further comprising:
   a rotating prism having a rotating axis vertical to the optical axis of illumination.
11. The projector according to claim 10,
   the rotating prism being arranged to be movable when the shielding member is located at the extended position, and being arranged to be stationary with a surface of the rotating prism on a light source apparatus side being vertical to the optical axis of illumination when the shielding member is located at the setback position.
12. The projector according to claim 10, further comprising:
   a sensor for detecting a rotating angle of the rotating prism.
13. The projector according to claim 10, further comprising:
   an anti-reflection film being formed on a light transmitting surface of the rotating prism.

* * * * *